US008939247B2

(12) United States Patent
Aydogan et al.

(10) Patent No.: US 8,939,247 B2
(45) Date of Patent: Jan. 27, 2015

(54) TRANSMISSION FOR ELECTRIC BICYCLES FOR DETECTING A TORQUE AND RELATED METHOD FOR ELECTRIC BICYCLES FOR DETECTING A TORQUE

(75) Inventors: Serdar Aydogan, Stuttgart (DE); Martin Zlindra, Magstadt (DE); Sigmund Braun, Kusterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 83 days.

(21) Appl. No.: 13/696,524

(22) PCT Filed: Apr. 27, 2011

(86) PCT No.: PCT/EP2011/056661
§ 371 (c)(1),
(2), (4) Date: Jan. 15, 2013

(87) PCT Pub. No.: WO2011/138202
PCT Pub. Date: Nov. 10, 2011

(65) Prior Publication Data
US 2013/0112038 A1    May 9, 2013

(30) Foreign Application Priority Data

May 6, 2010    (DE) .......................... 10 2010 028 643

(51) Int. Cl.
*B62M 6/50* (2010.01)
*B62M 3/16* (2006.01)
*G01D 7/02* (2006.01)

(52) U.S. Cl.
CPC . *B62M 3/16* (2013.01); *B62M 6/50* (2013.01); *G01D 7/02* (2013.01)
USPC ..................................................... 180/206.3

(58) Field of Classification Search
CPC .................................. B62M 6/45; B62M 6/40
USPC ..................................... 180/206.3; 73/862.31
See application file for complete search history.

(56) References Cited

U.S. PATENT DOCUMENTS

| 5,845,727 A | 12/1998 | Miyazawa et al. |
| 6,672,418 B1 | 1/2004 | Makino |
| 2002/0166708 A1 | 11/2002 | Tseng |
| 2003/0074985 A1* | 4/2003 | Liao .......................... 73/862.195 |

FOREIGN PATENT DOCUMENTS

| DE | 698 20 541 | 6/2004 |
| EP | 1 092 622 | 10/2000 |

(Continued)

*Primary Examiner* — Tony Winner
(74) *Attorney, Agent, or Firm* — Kenyon & Kenyon LLP

(57) ABSTRACT

A transmission for electric bicycles to detect a torque applied to a pedal crank shaft, includes a pedal crank shaft upon which the torque acts, a hollow shaft configured to connect to an output, through which the pedal crank shaft extends coaxially, and which is supported rotatably with respect to the pedal crank shaft, a sensor shaft offset in parallel with respect to the pedal crank shaft and a force sensor connected to the sensor shaft. The transmission includes a drive-side sensor transmission and an output side sensor transmission. The drive-side sensor transmission connects the pedal crank shaft to the sensor shaft and the output-side sensor transmission connects the sensor shaft to the hollow shaft, which is configured to be connected to an output, and the drive-side sensor transmission has a gear ratio which differs from the gear ratio of the output-side sensor transmission. A corresponding method is also described.

15 Claims, 6 Drawing Sheets

(56) References Cited

FOREIGN PATENT DOCUMENTS

| | | |
|---|---|---|
| JP | 53-3840 | 2/1978 |
| JP | 55 063730 | 5/1980 |
| JP | 10-194186 | 7/1998 |
| JP | 2000 079895 | 3/2000 |
| JP | 2000-142545 | 5/2000 |
| JP | 2008 189136 | 8/2008 |

* cited by examiner

TRANSMISSION FOR ELECTRIC BICYCLES FOR DETECTING A TORQUE AND RELATED METHOD FOR ELECTRIC BICYCLES FOR DETECTING A TORQUE

FIELD OF THE INVENTION

The present invention relates to a transmission for electric bicycles to detect a torque applied to a pedal crank shaft.

BACKGROUND INFORMATION

In the field of the present invention, i.e. particularly the field of electric bicycles and related pedal force sensors, there are mechanisms for torque detection, in order to conclude upon the cyclist power with the aid of the torque with which the pedal crank is being actuated. The cyclist power or a comparable quantity is used as an input quantity in the regulation of an electric auxiliary motor of electric bicycles. The sensors used are provided directly at exposed locations and fastened to elements via which the entire torque is transmitted. For this reason, they are particularly prone to error.

Besides solutions in which a force is ascertained directly by detection at the pedal crank shaft or by force sensors situated on the pedals, there are approaches that are in German document DE 698 20 41 T2. In this publication, a phase offset is detected between two wheels which are movable with respect to each other and which have a spring mechanism. However, the detection requires means such as optical or magnetic scanning and goes along with a "soft" drive, in which a torque is converted into a spring motion, instead of into a forward movement. In addition, the data evaluation required is costly.

It is therefore the object of the present invention to provide a simple mechanical system for detecting torque, without having to resort to error-prone or costly precautionary measures.

SUMMARY OF THE INVENTION

This object may be attained by the device and the method according to the description herein.

According to the present invention, the torque of the pedal crank that is to be measured is transferred to a sensor axis lying parallel to the pedal crank axis. Subsequently, the torque is conducted back again to a drive shaft that is rotatably supported coaxially on the pedal crank shaft or a drive shaft extending as an extension of the pedal crank shaft. Since in both transmissions sensor drives having different transmission ratios are used, that is, different sizes of the participating wheels, there comes about an overall force acting upon the sensor axis, and which is detected using a force sensor. The overall force is directly linked to the transmission ratios (which are constant) and the torque that is to be measured. The overall force may be deduced with the aid of the following system observation: Based on the energy received, the torques that are transmitted by the two sensor drives have to be different, since, in the same way (only reciprocally) the rotational speeds are different (friction being negligible in this case). Between the pedal crank shaft and the sensor shaft, due to this imbalance, there comes about an overall force which acts in the tangential direction of the torque transmission (i.e. the tangential motion of the rotational elements of the sensor transmission). Since the sensor transmissions pass on the rotational motion to a hollow shaft, which runs according to the longitudinal extension of the pedal crank shaft, the transmission according to the present invention is able to be used in a simple way in systems in which one may assume a single pedal crank shaft which is provided on the same axis of the pedal cranks and a drive element (e.g. a chain ring). The present invention may thus be integrated in a simple manner into known systems without a problem or introduced by exchange.

The drive shaft forms the shaft by which a rotational motion is transmitted by the pedal crank shaft (driven by the pedal crank drive) via the sensor drive, the drive shaft being provided for the connection to an output. This may be configured as a hollow shaft, but it may also be configured as any desired (solid or hollow) shaft, which extends along the same rotational axis as the pedal crank shaft. In this description, the term output shaft is used partially as a synonym for hollow shaft, since this expression may be the preferred one, in general, however, other shafts are able to be used as output shaft, as long as they have the same rotational axis as the output shaft.

The present invention relates to a transmission for electric bicycles to detect a torque applied to a pedal crank shaft. The transmission has:
the pedal crank shaft on which the torque is acting and a hollow shaft, configured for connecting to a drive, through which the pedal crank shaft extends coaxially. This extension prevents problems caused by a radial offset. The hollow shaft is supported rotatably with respect to the pedal crank shaft, which may be by a roller bearing, inside the hollow shaft, which connects the hollow shaft and the pedal crank shaft. The transmission also includes a sensor shaft offset radially to the pedal crank shaft. Because of this offset, a force is generated on the drive side (and a counteracting force on the drive side) which acts on the sensor shaft. In addition, the transmission includes a force sensor connected to the sensor shaft, which detects a force exerted by the sensor shaft which is equivalent to the torque to be detected. The connection between the sensor shaft and the force sensor may be direct, for instance by fastening the force sensor to a bearing of the sensor shaft or to a frame which supports the sensor shaft.

The transmission also includes a drive-side sensor transmission and an output side sensor transmission. The drive-side sensor transmission connects the pedal crank shaft to the sensor shaft and the output-side sensor transmission connects the sensor shaft to the hollow shaft to transmit a rotational motion. The hollow shaft is configured to be connected to an output drive, for instance, using connecting sections at the ends of the hollow shaft, to which a chain ring is able to be mounted. The drive-side sensor transmission has a gear ratio which differs from the gear ratio of the output-side sensor transmission. Because of this, force and counteracting force are not in equilibrium, and there is an overall force which is in a fixed ratio to the transmitted torque (for instance, in relation to the torque at the pedal crank shaft). The ratio is a strictly monotonic, particularly linear or proportional dependence of force sensed by the force sensor and the transmitted torque. The ratio factor is the greater, the greater the difference is between the two transmission ratios of the sensor transmissions.

One specific embodiment of the transmission, according to the present invention, provides that the drive-side sensor transmission has a drive-side pedal crank shaft wheel, which is situated on the pedal crank shaft and connected fixedly to it, as well as a drive-side sensor shaft wheel which is situated on the sensor shaft and fixedly connected to it. The drive-side sensor shaft wheel and the pedal crank shaft wheel engage with each other in order, according to a toothed wheel transmission, to transmit a rotational motion from the pedal crank shaft to the sensor shaft. Because of the transmission, the rotational axis of the rotational motion is offset radially outwards from the longitudinal axis of the pedal crank shaft to the rotational axis of the sensor shaft. The output-side sensor transmission includes an output-side hollow shaft wheel that is situated on the hollow shaft and connected fixedly to it, as well as an output-side sensor shaft wheel, that is situated on the sensor shaft and connected fixedly to it, or rather is directly connected fixedly to the drive-side sensor shaft wheel. The output-side sensor shaft wheel and the hollow shaft wheel engage with each other in order to transmit a rotational motion from the sensor shaft to the hollow shaft (i.e. the output drive).

One additional specific embodiment of the transmission, according to the present invention, provides that the transmission include a sensor frame in which the sensor shaft is rotationally supported. The force sensor is, on the one hand, connected to the sensor frame and, on the other hand, indirectly or directly to a housing element, which at least partially supports the pedal crank shaft or the hollow shaft. Furthermore, the power sensor may be provided between the sensor frame and an area that is also connected in a force-transmitting manner to the pedal crank shaft or the hollow shaft. The sensor is thereby able to detect the force difference on the frame which comes about because of the different transmission ratios. In addition, it is possible, because of this support, that a yielding force sensor is used whose position changes in response to different forces (increasing spring excursion with increasing force), since the frame and the sensor transmission permit an offset within certain limits, without the performance of the mechanical rotational motion transmission changing because of the transmission.

The transmission, according to the present invention, is able to provide that the drive-side sensor transmission, the output-side sensor transmission or both sensor transmissions have at least one transmission wheel, which is developed as a toothed wheel having outer toothing. Alternatively, the at least one transmission wheel may be provided as outer toothing of the pedal crank shaft of the sensor shaft or the hollow shaft. Additional possibilities of the development provide that the at least one transmission wheel is developed as inner toothing of the pedal crank shaft, the sensor shaft or the hollow shaft. These developments may be combined. A transmission wheel is configured to transmit a rotational motion from the pedal crank shaft to the sensor shaft, or from the sensor shaft to the hollow shaft, the transmission being able to be provided via additional wheel connections.

In particular, the drive-side sensor transmission may be developed by a pair of mutually engaging toothed wheels having outer toothing, and the output-side sensor transmission may be developed by a pair of mutually engaging toothed wheels. The drive-side or the output-side sensor transmission may be developed from a pair of mutually engaging outer toothings. At least one of the two pairs provides a mutually engaging outer toothing as a toothing which is developed directly on an outer side of the pedal crank shaft, of the sensor shaft or of the hollow shaft. The toothing of a toothed wheel engages in this outer toothing. As an alternative, the drive-side sensor transmission, the output-side sensor transmission or both sensor transmissions may each have the toothings of one pair. In this case, the toothing of a pair is an outer toothing of a toothed wheel, an outer toothing of the pedal crank shaft, the sensor shaft or the hollow shaft, or an inner toothing of a hollow wheel. The other toothing of the pair is an outer toothing of a toothed wheel that is mounted on the pedal crank shaft, the sensor shaft or the hollow shaft, or it is an outer toothing of the pedal crank shaft, the sensor shaft or the hollow shaft. These developments make possible the saving of space and component parts.

The variant of the transmission, according to the present invention, provides that the drive-side sensor transmission is developed from a drive-side crank drive shaft wheel which is mounted on the pedal crank shaft, and of a first inner toothing of a hollow wheel which forms the sensor shaft as a hollow shaft piece. The output-side sensor transmission is formed by an output-side hollow shaft wheel which is mounted on the hollow shaft working as the output shaft, and an additional inner toothing of the hollow wheel, which is offset axially to the first inner toothing. The inner toothings are connected to each other via the hollow wheel. The inner toothings have different radii, which lead to different transmission ratios. In this specific embodiment, the hollow wheel replaces the sensor shaft and connects the two wheels which, in other specific embodiments of the present invention are located in common on the sensor shaft.

The gear ratio of the drive-side sensor transmission may be equivalent to the reciprocal value of the gear ratio of the output-side sensor transmission, so that an overall transmission ratio of 1 is achieved.

The force sensor may be a piezoelement, for example, or a force-sensitive semiconductor element. Furthermore, the force sensor may include a spring element or a torsion element and an associated odometer and angle transmitter, for instance, in the form of a strain gauge which is situated on an elastically deformable element. The spring excursion of the spring may further be detected by a displacement sensor, for instance, a hall element or even an optical sensor, in connection with maskings of a magnetic or optical type.

The present invention is further provided in a method for detecting a torque applied to a pedal crank shaft. The method provides the following steps: transmitting the torque from the pedal crank shaft to a sensor shaft which is offset in parallel to the pedal crank shaft, via a drive-side sensor transmission, and transmitting a corresponding torque from the sensor shaft to a hollow shaft connected to the output drive, which has the same axis of rotation as the sensor shaft, via an output-side sensor transmission. The transmission is provided via the drive-side sensor transmission having a gear ratio that differs from the output-side sensor transmission. The method further provides detecting a force that acts upon the sensor shaft, using a force sensor. The force sensor, in this case, is connected to the sensor shaft in a force-transmitting manner. The amount of the detected force reflects the strength of the torque.

The method according to the present invention is able to provide that the sensor shaft, which transmits the rotational motion, is supported rotatably in a sensor frame. The force, in this instance, is detected by the force sensor supporting the sensor frame, in order to detect the force that acts upon the sensor frame based on the sensor shaft.

Finally, the method is able to provide that the torque is transmitted via the sensor transmission by mutually engaging outer toothings of toothed wheels or of toothed wheels and the outer toothings of one of the shafts. The toothings and the toothed wheels form the sensor transmission. The toothings are the outer toothing of a toothed wheel or an outer toothing of one of the shafts, which engage with an inner toothing of a hollow wheel that provides the sensor shaft. These options may also be used in combined form.

In contrast to numerous known sensors, the present invention also makes possible the reversal of the direction of rotation of the torque, without hysteresis being created during the measurement.

Exemplary embodiments of the present invention are depicted in the figures and are explained in more detail in the description below.

DETAILED DESCRIPTION

Figure 1:
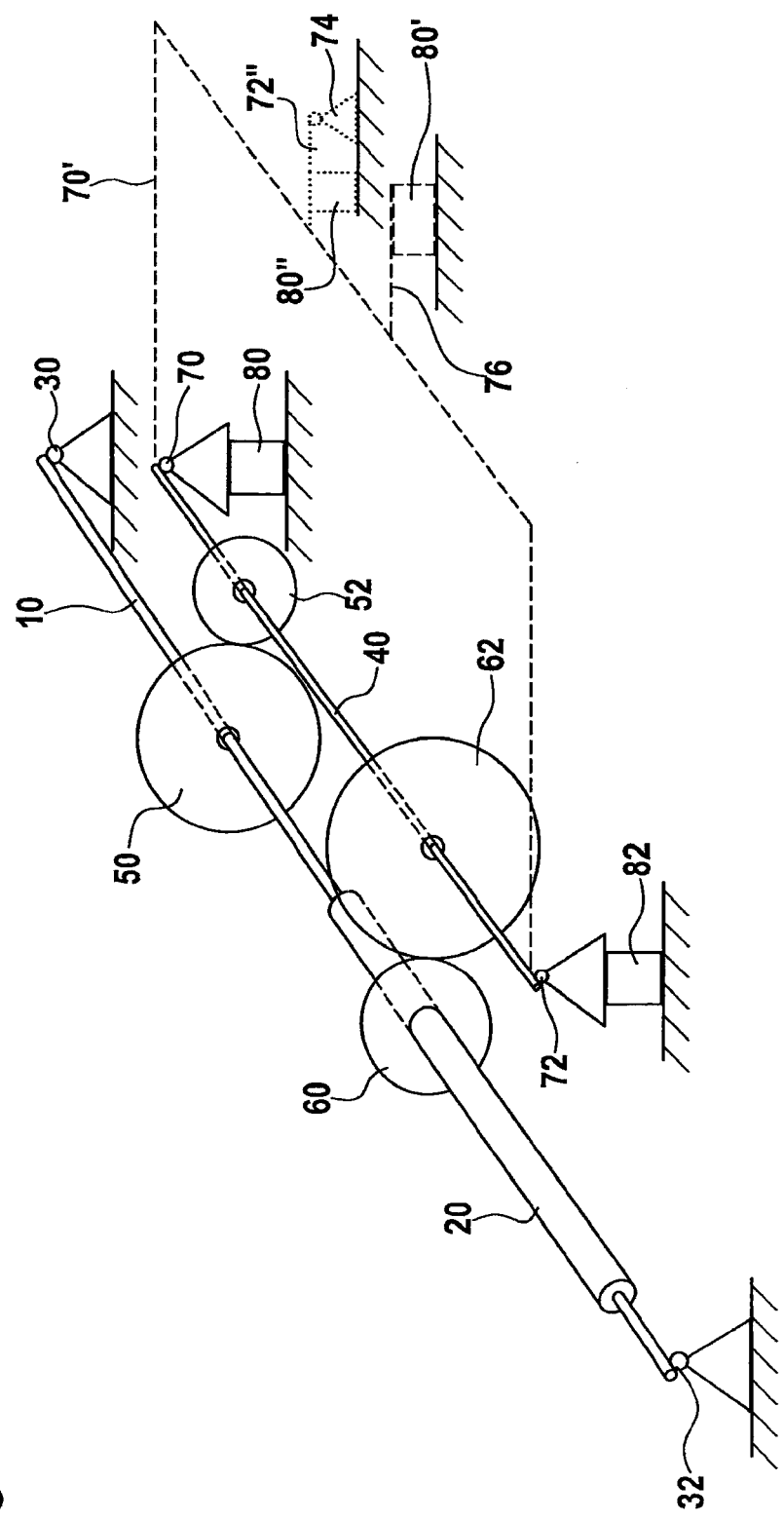
FIG. 1 shows a symbolically shown specific embodiment of the present invention to explain the characteristics.

FIG. 1 is a perspective representation to explain the basic principle of the present invention. The transmission shown in FIG. 1 includes a pedal crank shaft 10, a hollow shaft or output shaft 20 and a sensor shaft 40. Pedal crank shaft 10 is held by rotary bearings 30, 32, while the hollow shaft is supported rotationally by rotary bearings, that are not shown, on pedal crank shaft 10. On pedal crank shaft 10, a drive-side crank drive shaft wheel 50 is fastened which is in engagement with a drive-side sensor shaft wheel 52. Drive-side sensor shaft wheel 52, same as an output-side sensor shaft wheel 62, is situated on sensor shaft 40. Drive-side crank drive shaft wheel 50 engages with drive-side sensor shaft wheel 52. Output-side sensor shaft wheel 62, same as sensor shaft wheel 52, is situated on sensor shaft 40. Sensor shaft wheel 62 is in engagement with an output-side hollow shaft wheel 60, which is situated on hollow shaft 20 in a torsionally fixed manner. Hollow shaft 20 is situated on pedal crank shaft 10 in a rotatable and concentric manner. In principle, the output shaft (i.e. hollow shaft 20) may also be developed as a shaft having a continuous cross section (not shown), the outgoing shaft being situated parallel to the pedal crank shaft. The system shown in FIG. 1 does have the advantage, though, of a continuous pedal crank shaft 10, which extends from crank to crank and also supports hollow shaft 20. Based on the shown diameters of shaft wheels 50-62 one may recognize that these wheels provide different gear ratios, i.e. a first gear ratio between shaft wheels 50 and 52 is greater than 1 and a second gear ratio between shaft wheels 62 and 60 is also greater than 1. Shaft wheels 50-62 provide an overall gear ratio of greater than 1, this not necessarily being generally the case. Rather, wheels 50 and 62, and 60 and 52 may generally have different sizes and, in this context, reflect different individual and overall gear ratios. Wheels 52 and 62 may have different effective diameters.

Sensor shaft 40 is connected to rotary bearings 70, 72 which are supported opposite to pedal crank shaft 10. Rotary bearing 70 is connected via a force sensor 80 to an area 90 supporting it. Rotary bearing 72 is connected via an additional force sensor 82 to this supporting area 90 supporting it. Area 90 is a part of the transmission housing. Instead of at an area 90, force sensors 80, 82 may also support themselves in bores or other elements of the transmission housing. As an alternative, only one of the rotary bearings may be connected via a force sensor to an area supporting it, while the other rotary bearing is supported directly, i.e. without a force sensor.

An alternative support is shown by frame 70' as a dashed line. Frame 70' is connected to sensor shaft 40 via rotary bearings 70, 72. Frame 70' is supported via a force sensor 80' and a connection 76 leading to force sensor 80', the supporting point associated with the support being situated radially offset to sensor shaft 40. Connection 76 is connected to force sensor 80' in a torsionally fixed manner. In this specific embodiment, frame 70 is not supported on the side of the pedal crank.

An additional alternative support, which is carried out using frame 70' (i.e. without there being a connection to rotary bearings 70, 72), provides that, at a support point that is radially offset from sensor shaft 40, a connection 72" is provided which connects frame 70' to a rotary bearing 74. A force sensor 80" is situated between connection 72" and a support which is again a part of transmission housing 90. Force sensor 80" detects the force which comes about in response to the rotation of connection 72" about rotary bearing 74. In this connection, frame 70' is not supported on the side of the pedal crank, but rather, frame 70' is supported in rotary bearing 74. For the better stabilization of frame 70', two or more rotary bearings 74 may also be present at respectively different places of frame 70'.

Instead of a rotary bearing 74, one may also generally speak of a rotary support.

Frame 70' encompasses both sensor transmissions 50, 52 and 60, 62, but may also only encompass only one sensor transmission, the other sensor transmission being situated axially offset to the frame. Furthermore, the frame may carry the sensor shaft only laterally, and be developed as a cantilever, from which the sensor shaft extends away in the radial direction, the cantilever supporting the sensor shaft laterally and rotatably.

Figure 2:
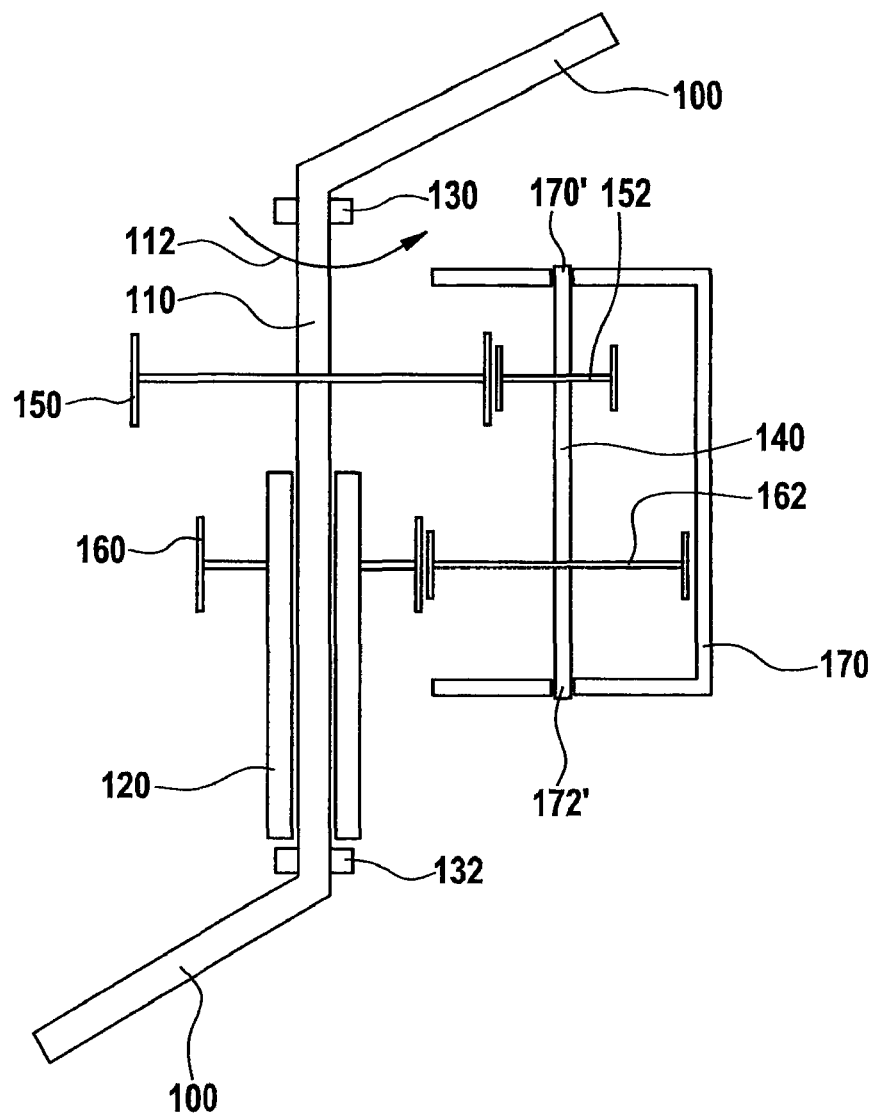
FIG. 2 shows a first embodiment of the transmission according to the present invention.

FIG. 2 shows a first embodiment of the transmission according to the present invention, having crank 100, crank shaft 110 which is supported rotatably by bearings 130, 132, in order to be able to carry out a rotation according to arrow 112. On crank shaft 110, drive-side crank drive shaft wheel 150 is situated torsionally fixed and output-side hollow shaft wheel 160 is situated rotatably. Sensor shaft 40 has a drive-side sensor shaft wheel 152 and an output-side sensor shaft wheel 162, which are in engagement with wheels 150 and 160 respectively. The frame has an U-shaped extension, the two opposite legs having the rotary bearings 170', 172'. The sensor shaft is rotatably supported in a frame 170 by rotary bearings 170', 172'. The force is measured by a force sensor that is not shown, via which frame 170 is supported. The support not shown, via which the force sensor holds the frame, takes up forces in the tangential direction (with respect to the rotation of the sensor shaft or the pedal crank shaft). The output-side sensor transmission is formed by wheels 160, 162, and the drive-side sensor transmission is formed by wheels 150, 152. The reciprocal value of the gear ratio of the output-side sensor transmission differs from the transmission ratio of the drive-side sensor transmission, whereby there comes about a (selectable) overall transmission ratio between crank shaft 110 and drive shaft 120 (executed as a hollow shaft). The frame encompasses both sensor transmissions.

Figure 3:
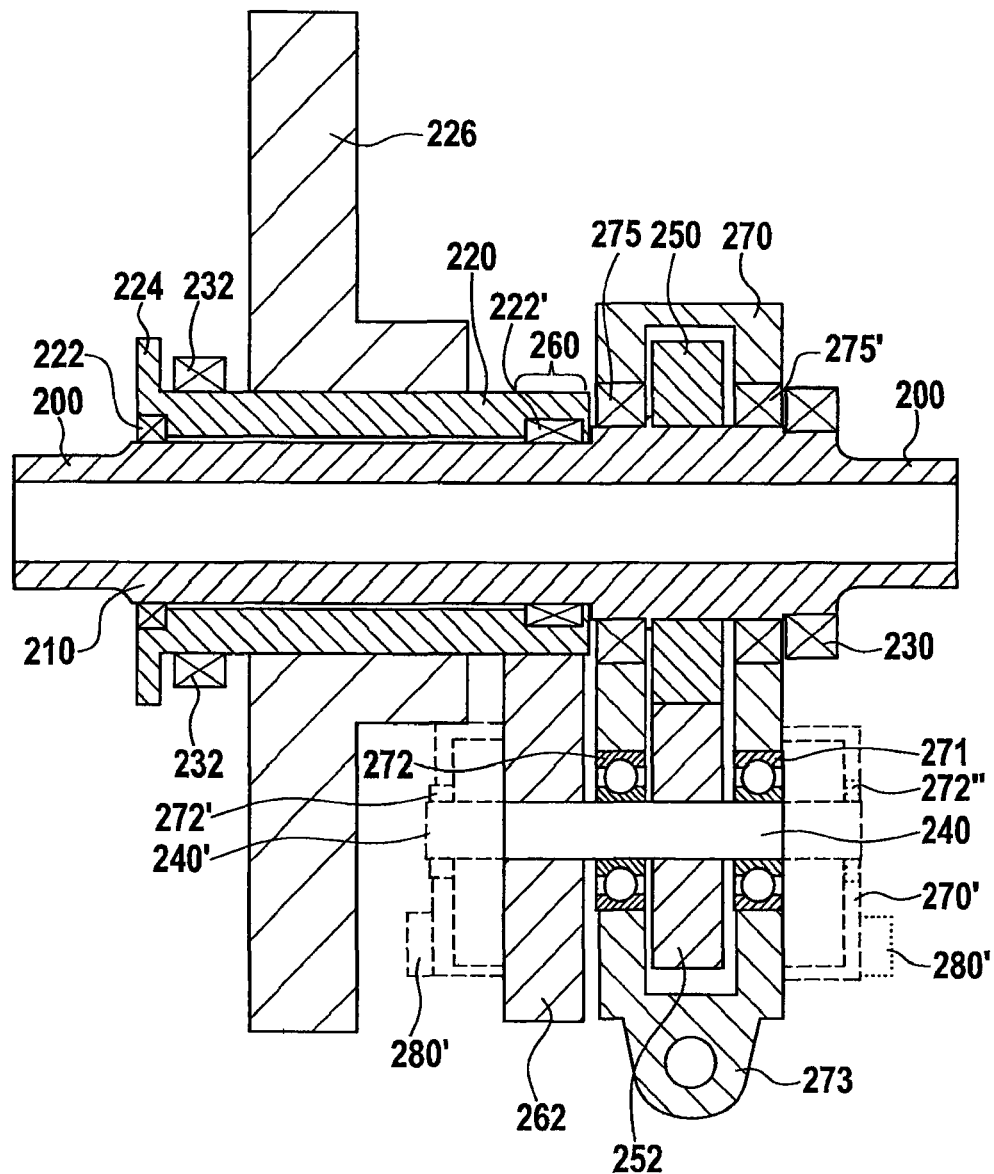
FIG. 3 shows a second embodiment of the transmission according to the present invention.

FIG. 3 shows a second embodiment of the transmission according to the present invention, having a pedal crank shaft or crank shaft 210 at whose ends fastening elements 200 for pedal cranks are provided. On crank shaft 210, a hollow shaft 220 is rotatably supported via rotary bearings 222 and 222'. The crank shaft is supported on one side by a rotary bearing 230 and on the other side by a rotary bearing 232, which is located on the hollow shaft, via rotary bearing 222 between hollow shaft 220 and crank shaft 210 so that the crank shaft is also supported. Hollow shaft 220 at one end has a radially extending protuberance 224, which provides fastening elements (not shown) for the output drive.

A frame 270 is fastened on the pedal crank via rotary bearings 275 and 275', which carries a sensor shaft 240 via rotary bearings 271, 272. On sensor shaft 240, a first wheel 252 (drive-side sensor shaft wheel) and a second wheel 262 (output-side sensor shaft wheel) are fastened, only one of the wheels (wheel 252) being surrounded by the frame, and the other wheel 262 is located next to the frame, the sensor shaft also extending laterally (i.e. axially) from frame 270, in order rotatably to support there the other wheel 262. First wheel 252 of sensor shaft 240 is in engagement with a drive-side crank drive shaft wheel 250, which is connected to pedal crank shaft 210 in a torsionally fixed manner. Second wheel 262, which is located outside the frame, is in engagement with a toothing 260 of the hollow shaft. Toothing 260 of hollow shaft 220 forms a toothed wheel, the toothing being situated in the outer surface of the hollow shaft. There comes about a savings in elements as well as a lower diameter for toothing 260, which may be viewed as an output-side hollow shaft wheel that is developed as one part with hollow shaft 260. An output wheel (i.e. a chain wheel for connecting to the running wheel of the bicycle) 224 is situated on hollow shaft 220 in a torsionally fixed manner. On hollow shaft 220 there is also situated a drive element in the form of a toothed wheel 226, via which an additional torque of a motor is able to be applied to hollow shaft 220.

For the force detection, the frame has a sensor frame bearing 273, at which a force occurs which reflects the transmitted torque. Sensor frame bearing 273 is configured as a fastening element at one end of sensor frame 270, which is located at a distance from the crank shaft. A force sensor (not shown) is connected to sensor frame bearing 273. Sensor frame bearing 273 corresponds to bearings 72", 76 of the transmission shown in FIG. 1.

An alternative embodiment of the sensor frame is shown in FIG. 3 in dashed/dotted lines. The sensor frame (shown in dashed lines), in the alternative embodiment, encompasses both wheels 262, 252 that are situated on sensor shaft 240', sensor shaft 240' being supported rotatably by rotary bearings 272', 272" that are provided in the frame. Sensor shaft 240' is longer than the sensor shaft, and extends from one side of the frame to the other side of the frame. The frame includes rotary point elements 280', which are situated on both axial sides of the frame on one side of the frame, which lies at a distance from the crank shaft in the radial direction. Rotational point elements 280' are developed in one piece with the frame. Rotational point elements 280' are cylinder-shaped (the height being of the order of magnitude of the radius) and are supported rotatably in a housing which also supports the pedal crank shaft (and the hollow shaft) indirectly or directly. The support includes a force sensor which detects a tangential force (with respect to the pedal crank shaft). If a yielding force sensor (having spring excursion) is used, the frame easily tilts in the rotational direction that the rotational point elements 280' specify. This makes possible an adjustment without the transmission being damaged. The force sensor is fastened to the frame at a place which is radially offset (with reference to the axis of rotation which rotational point elements 280' specify) from rotational point elements 280'. Alternatively, a torque sensor may also be used as a force sensor, which supports the rotational point elements 280' in a torsionally fixed manner. The frame is situated at a distance from toothed wheel 226, so as to enable a free rotation of toothed wheel 226, and to enable a slight tilting motion of the frame about shaft 210, which corresponds to the spring deviation of the force sensor at different loads. The frame may be offset from the toothed wheel in the longitudinal direction of shaft 210, in order to assure these free motions.

Figure 4:
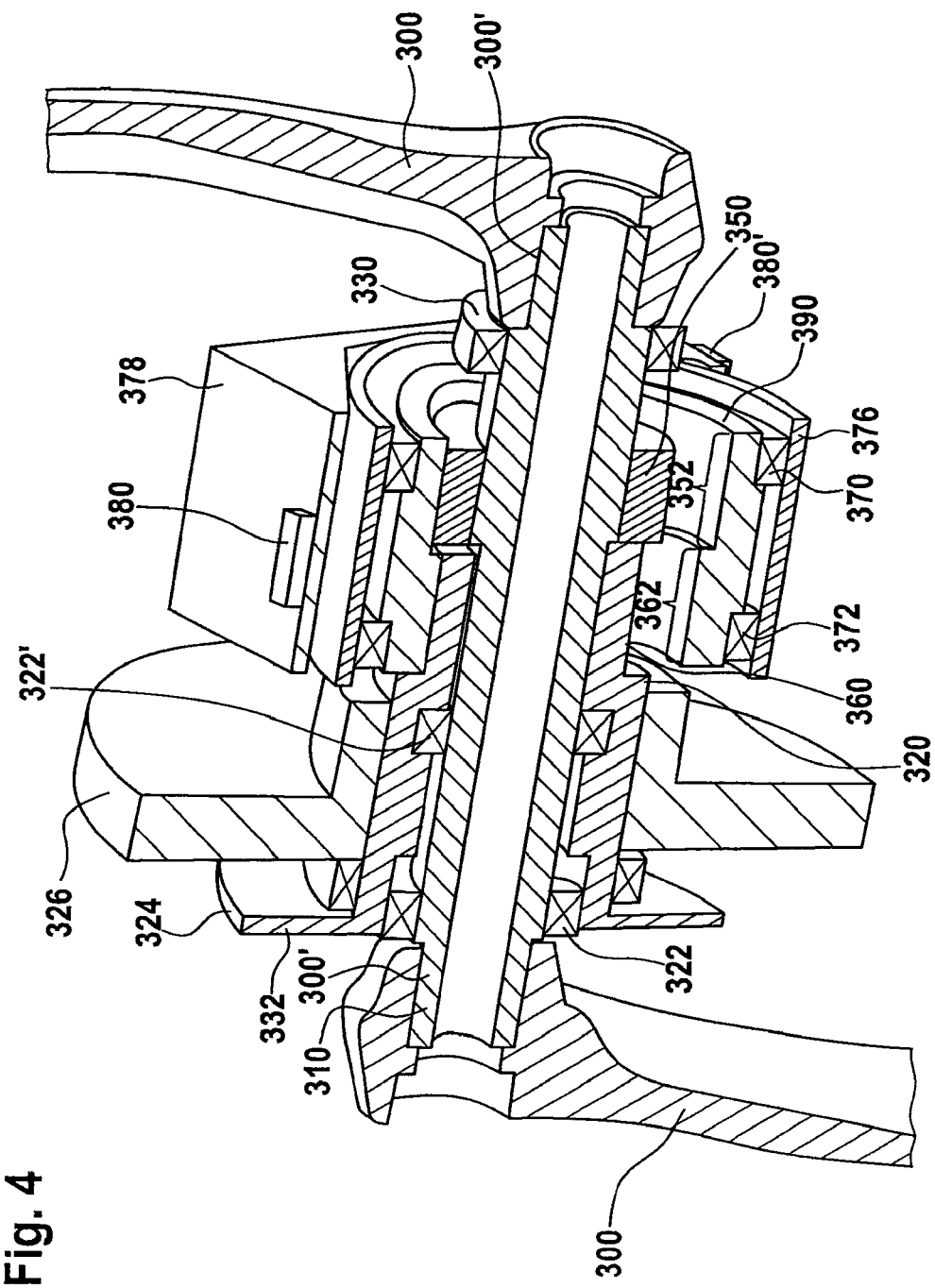
FIG. 4 shows a third embodiment of the transmission according to the present invention.

FIG. 4 shows a third embodiment of the transmission according to the present invention, having a pedal crank shaft or crank shaft 310, on which, at fastening locations 300', cranks 300 are situated at both ends of crank shaft 310. On crank shaft 310, a hollow shaft 320 is rotatably supported via rotary bearings 222, 322' that are offset axially with respect to each other. Hollow shaft 320 has at its end, that is opposite to the end of the hollow shaft that faces the sensor transmission, a connecting possibility (in the form of a protuberance 324) for a sprocket wheel 324 for driving a rear wheel of the bicycle. On hollow shaft 320 there is also situated a drive element in the form of a toothed wheel 326, via which an additional torque of a motor is able to be applied to hollow shaft 320. A rotary bearing 332 supports hollow shaft 320 (and consequently also crank shaft 310, and a rotary bearing 330 supports crank shaft 310 at the opposite end of crank shaft 310.

On crank shaft 310 a crank drive shaft wheel is situated, that is rigidly connected to it, which engages with an inner toothing 352, which may be regarded as a drive-side sensor shaft wheel. Inner toothing 352 is situated on the inside of a hollow wheel 390. The inside of the hollow wheel further has an inner toothing 362, which may be regarded as an output-side sensor shaft wheel. The end of the hollow shaft facing the sensor transmission has an outer toothing 360, which acts as an output-side hollow shaft wheel, and which is in engagement with inner toothing 362. Inner toothing 352 is axially offset with respect to inner toothing 362. Inner toothing 352 and inner toothing 362 have different diameters. The radii of the inner toothings and the radii of outer toothing 360 and toothed wheel 350 are freely selectable within broad limits, as long as different transmission ratios come about. Between the inner side of hollow shaft 320 and the outer side of the pedal crank, there is a continuous gap, particularly at the height of outer toothing 360, which enables rotation with respect to pedal crank shaft 310. The gap is especially visible in FIG. 4, in the upper half of the illustration. Inner toothings 362 and 352 are connected to each other in a torsionally fixed manner, particularly because of the in-one-piece embodiment with hollow wheel 390. Because of this, hollow wheel 390 also forms the sensor axis, which is executed in this case within the meaning of a short hollow shaft.

Hollow wheel 390 is supported on its outer side by rotary bearings 370, 372, that are radially offset with respect to each other, from an outer bearing sleeve 376 of the hollow wheel bearing. On the outer side of bearing sleeve 376, a frame 378 is provided, which encompasses the bearing sleeve and is connected to it in a force-transmitting manner. A force sensor 380, 380' is situated on the bearing sleeve, force sensor 380 being an alternative to force sensor 380', and vice versa. Because of the different transmission ratios, a force is generated which acts in the radial direction (with respect to the axis of rotation of the pedal crank). The force acts perpendicularly to the plane in which the contact line of the sensor shaft-side toothings and the crank shaft-side toothings (i.e. the toothing of the sensor transmission) lie, as well as the axis of rotation of the crank shaft (and the output shaft). Force sensor 380 or 380' (indirectly or directly) connects an outer carrier (not shown) to frame 378, the carrier also being connected (indirectly or directly) to bearings 330, 332 of crank shaft 310 and output shaft 320 in a force-transmitting manner.

Figure 5:
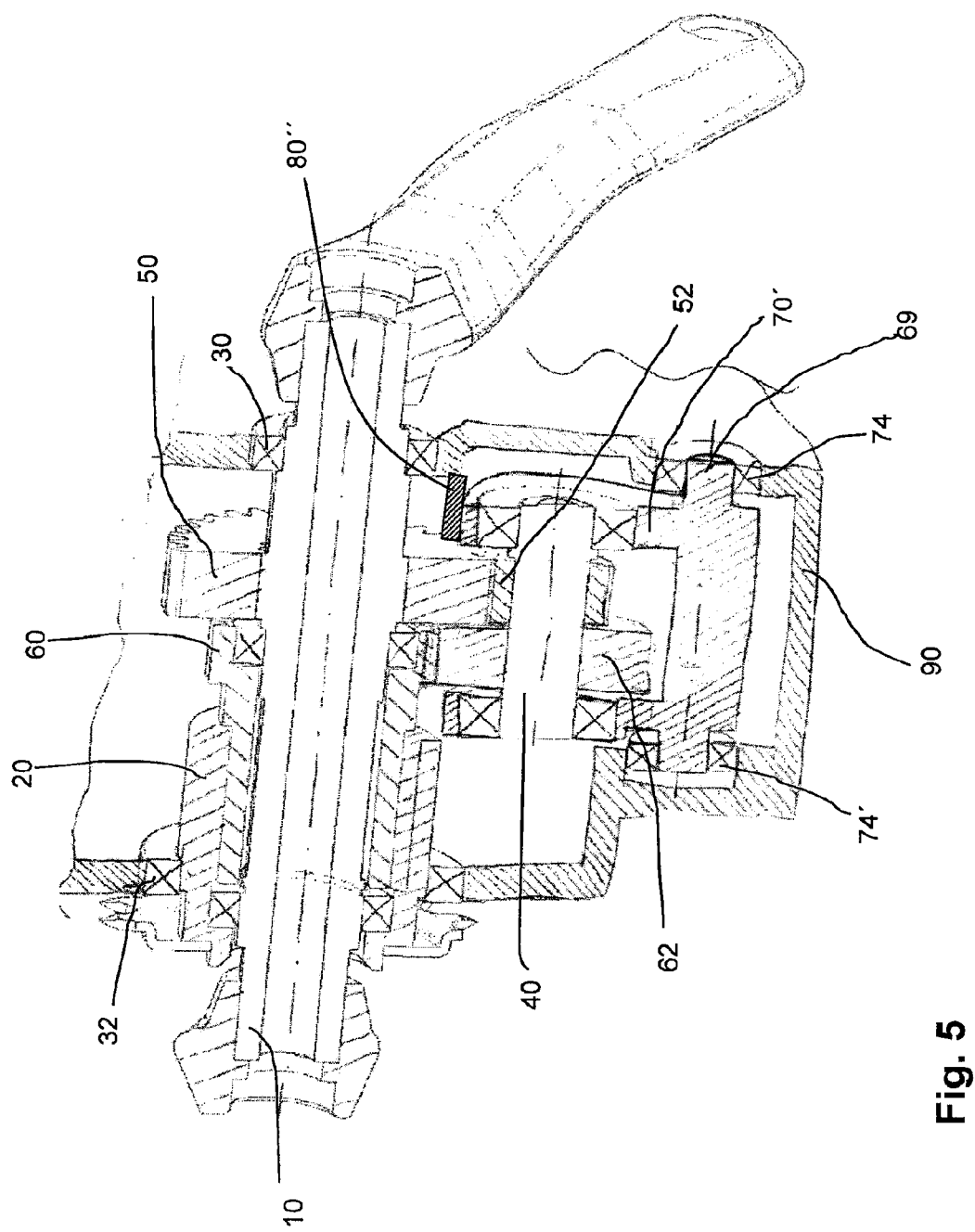
FIG. 5 shows a fourth embodiment of the transmission according to the present invention.
Figure 6:
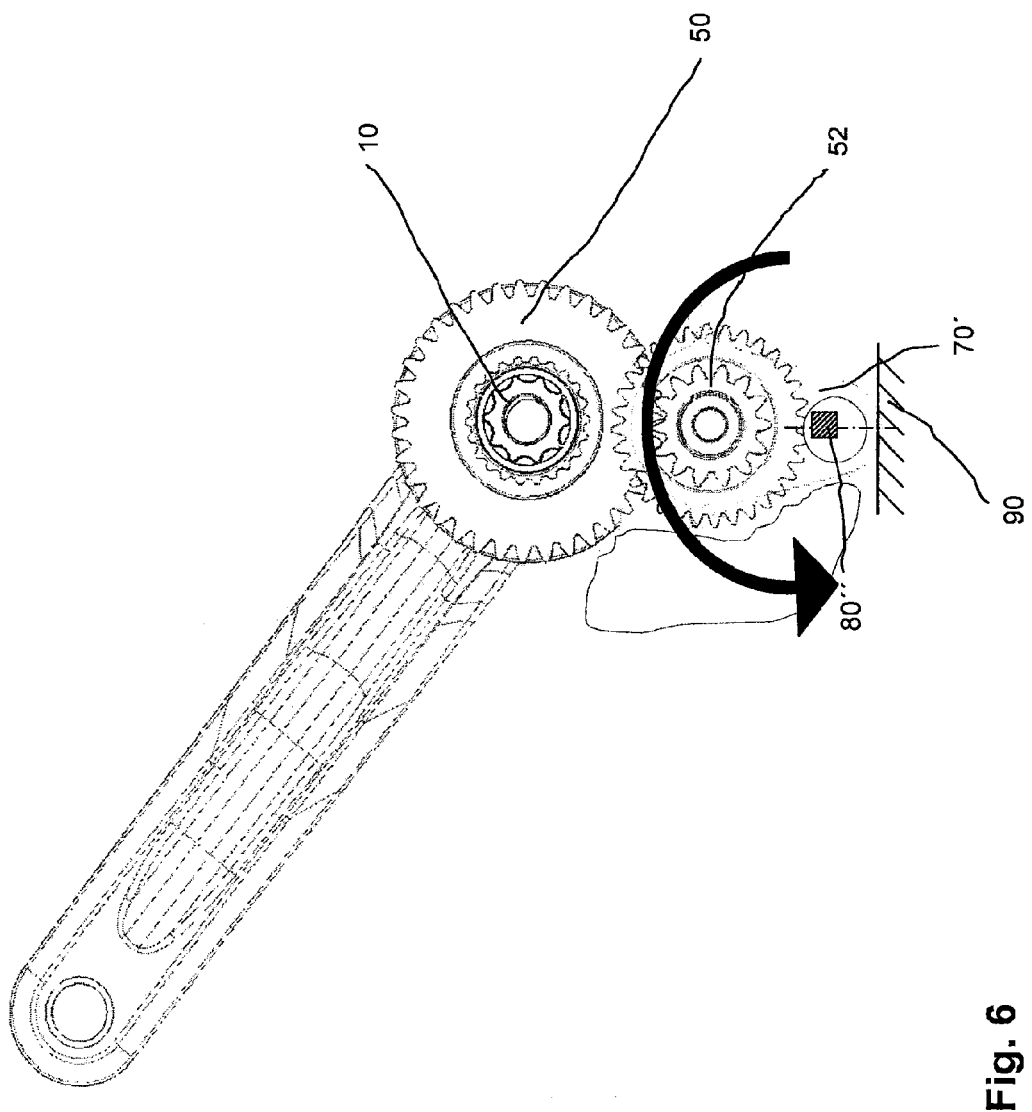
FIG. 6 shows a modification of the development as in FIG. 5.

In FIG. 5 and in FIG. 6 the constructive embodiment is shown of the variant according to FIG. 1, having force sensor 80" situated between connection 72 and a support 90, and a corresponding modification to this. For a better understanding, the reference numerals from FIG. 1 have been taken over into the constructive representation according to FIGS. 5 and 6. Frame 70' is rotatably supported in transmission housing 90 with the aid of rotary bearings 74 and 74'. In frame 70' sensor shaft 40 is also supported via rotary bearings 70" As was explained in FIG. 1, toothed wheels (sensor transmission) 52, 62 are situated on sensor shaft 40, which are in operative connection to toothed wheels (sensor transmission) 50, 60 that are located on pedal crank shaft 10. Toothed wheels 52 and 62 are connected to each other in a force-transmitting manner. The flow of force takes place from pedal crank shaft 10 via toothed wheels 50, 52, 62 and 60 to output shaft 20. The supporting of pedal crank shaft 10 is performed via rotary bearings 30 and 32. Force sensor 80", already shown in FIG. 1, is situated between frame 70' and transmission housing 90 in such a way that it makes possible supporting frame 70' with respect to transmission housing 90, and thus, in response to force action, prevents the twisting of frame 70' about the axis of rotation of rotary bearings 74, 74'. This means that force sensor 80" is situated between transmission housing 90 and frame 70' in such a way that it detects the relative motion of these two parts in the form of bending. This bending of force sensor 80" may be recorded with the aid of a or by Hall elements. However, all other sensors are conceivable for the force recording. As an example, we might mention a Wheatstone bridge. The positioning of force sensor 80" is shown in FIG. 5 in the area of the rotary bearing of sensor shaft 40 between frame 70' and sensor housing 90. Because of this arrangement of force sensor 80", a relatively large bending, and thus a very good measuring signal would come about. Force sensor 80" would in this case be removed as far as possible from axis of rotation 69 of frame 70'. Depending on the installation relationships, another location would also be conceivable for force sensor 80". Now, the sensor signal of force sensor 80" is used to regulate and control the electric motor. In this case, the sensor signal has, in the actual sense, detected the torque generated by the cyclist, and is thus used for regulating or controlling the electric motor. FIG. 6 now shows a modification of FIG. 5. In FIG. 6, frame 70' is rigidly connected directly to transmission housing 90. This means that rotary bearings 74 and 74', shown in FIG. 5 and in FIG. 1, are not used or developed in this case. According to the representation as in FIG. 6, force sensor 80" is now positioned directly on frame 70', and has no connection to transmission housing 90. Force sensor 80" now measures the so-called inner forces that act on frame 70'. Its measuring signals are used as also in the case of FIG. 5.

The reference numerals of the different figures, which are the same except for the first-place number (for three-digit reference numerals), refer to the same features and components, the properties shown in the description applying for all components characterized by reference numerals that are similar.

What is claimed is:

1. A transmission for an electric bicycle for detecting an applied torque that acts upon a pedal crank shaft arrangement, comprising:
 a pedal crank shaft, upon which the applied torque acts;
 an output shaft configured for connection to an output;
 a sensor shaft offset in parallel with the pedal crank shaft; and
 a force sensor connected to the sensor shaft, which detects a force exerted by the sensor shaft which corresponds to the torque to be detected;
 a drive-side sensor transmission; and
 an output-side sensor transmission;
 wherein the drive-side sensor transmission connects the pedal crank shaft to the sensor shaft and the output-side sensor transmission connecting the sensor shaft to the output shaft, wherein the drive-side sensor transmission transmits the applied torque from the pedal crank shaft to the sensor shaft, and wherein the output-side sensor transmission transmits a torque corresponding to the applied torque from sensor shaft to the output shaft, and wherein the drive-side sensor transmission has a gear ratio which differs from the gear ratio of the output-side sensor transmission.

2. The transmission of claim 1, wherein the output shaft is configured as a hollow shaft, through which the pedal crank shaft extends coaxially, and which is rotatably supported with respect to the pedal crank shaft.

3. The transmission of claim 1, wherein the drive-side sensor transmission has a drive-side pedal crank shaft wheel, which is situated on the pedal crank shaft and is rigidly connected to it, and has a drive-side sensor shaft wheel, which is situated on the sensor shaft and is rigidly connected to it, wherein the drive-side sensor shaft wheel and the pedal crank shaft wheel engage with each other, wherein the output-side sensor transmission includes an output-side shaft wheel, which is situated on the output shaft and is rigidly connected to it, and includes an output-side sensor shaft wheel which is situated on the sensor shaft and is rigidly connected to it, and wherein the output-side sensor shaft wheel and the output-side shaft wheel engage with each other.

4. The transmission of claim 1, wherein the transmission includes a sensor frame in which the sensor shaft is supported rotatably, and the force sensor, between the sensor frame and the housing, is connected indirectly or directly to a bearing element, which supports the pedal crank shaft at least partially, or the force sensor being provided between the sensor frame and an area which is also connected to the pedal crank shaft in a force-transmitting manner.

5. The transmission of claim 1, further comprising:
 a sensor frame which is supported in the housing of the transmission with the aid of a bearing and in the sensor frame the sensor shaft being supported rotatably, the force sensor being supported between the sensor frame and the housing of the transmission so that it records a tangential force, which acts upon the sensor frame and prevents a rotational motion of the sensor frame.

6. The transmission of claim 5, wherein the force sensor is situated at a distance from the rotational axis of the sensor frame.

7. The transmission of claim 1, further comprising:
 a sensor frame in which the sensor shaft is supported rotatably, and the force sensor is situated on the sensor frame, so that it detects the inner forces which act upon the sensor frame.

8. The transmission of claim 7, wherein the sensor frame is rigidly connected to the housing of the transmission.

9. The transmission of claim 1, wherein at least one of the drive-side sensor transmission and the output-side sensor transmission has a transmission wheel which is configured as one of: a toothed wheel having outer toothings; outer toothings of the pedal crank shaft; outer toothings of the sensor shaft; outer toothings of the output shaft; inner toothings of the pedal crank shaft; inner toothings of the sensor shaft; or inner toothings of the output shaft.

10. The transmission of claim 9, wherein the drive-side sensor transmission includes a first pair of mutually engaging toothed wheels having outer toothing and the output-side sensor transmission includes a pair of mutually engaging toothed wheels, at least one of the first and second pairs of mutually engaging outer toothings including a toothing which is configured directly on an outer side of one of the pedal crank shaft, the sensor shaft or the output shaft, into which the toothing of a toothed wheel engages, wherein one toothing of the at least one of the first and second pairs is one of an outer toothing of the pedal crank shaft, an outer toothing of the sensor shaft, an outer toothing of the output shaft, or an inner toothing of a hollow wheel, and the other toothing of the at least one of the first and second pairs being an outer toothing of a toothed wheel which is mounted on one of the pedal crank shaft, the sensor shaft or the output shaft, or being an outer toothing of one of the pedal crank shaft, the sensor shaft or the output shaft.

11. The transmission of claim 9, wherein the drive-side sensor transmission is formed by a drive-side crank drive shaft wheel which is mounted on the pedal crank shaft and a first inner toothing of a hollow wheel which forms the sensor shaft as a hollow shaft piece, and the output-side sensor transmission is formed by an output-side hollow shaft wheel which is situated on the output shaft and an additional inner toothing of the hollow wheel which is offset axially with respect to the first inner toothing, and wherein the inner toothings of the hollow wheel are connected to each other and have different radii.

12. The transmission of claim 1, wherein the gear ratio of the drive-side sensor transmission corresponds to a reciprocal of the gear ratio of the output-side sensor transmission.

13. A method for detecting an applied torque by which a pedal crank shaft is acted upon, the method comprising:
  transmitting the applied torque from the pedal crank shaft to a sensor shaft via a drive-side sensor transmission, wherein the sensor shaft is offset in parallel with respect to the pedal crank shaft;
  transmitting, via an output-side sensor transmission, a torque corresponding to the applied torque, from the sensor shaft to an output shaft connected to an output, wherein the output shaft has a same axis of rotation as the pedal crank shaft, wherein the transmission of the applied torque via the drive-side sensor transmission is implemented with a gear ratio which differs from a gear ratio of the output-side sensor transmission;
  detecting a force that acts upon the sensor shaft, using a force sensor which is connected to the sensor shaft in a force-transmitting manner, wherein an amount of the detected force reflects a strength of the applied torque.

14. The method of claim 13, wherein the sensor shaft is supported rotatably in a sensor frame, and wherein the force is detected by the force sensor supporting the sensor frame to detect the force which is acted upon the sensor frame by the sensor shaft.

15. The method of claim 13, wherein the torque is transmitted via the sensor transmissions by mutually engaging outer toothings of toothed wheels or by toothed wheels and outer toothings of one of the shafts.

* * * * *